Jan. 20, 1959 L. HORNBOSTEL 2,869,817
STREAM FLOW VALVE
Filed March 6, 1956 3 Sheets-Sheet 1

Inventor
Lloyd Hornbostel
By Hill, Sherman, Meroni, Gross & Simpson Attys

Jan. 20, 1959  L. HORNBOSTEL  2,869,817
STREAM FLOW VALVE

Filed March 6, 1956  3 Sheets-Sheet 3

Inventor
Lloyd Hornbostel
by Hill, Sherman, Meroni, Gross & Simpson Attys

United States Patent Office 2,869,817
Patented Jan. 20, 1959

2,869,817

STREAM FLOW VALVE

Lloyd Hornbostel, Beloit, Wis., assignor to Beloit Iron Works, Beloit, Wis., a corporation of Wisconsin Application March 6, 1956, Serial No. 569,752

10 Claims. (Cl. 251—133)

This invention relates generally to a valve for controlling the flow of a stream through a conduit without producing eddy currents, "dead" spots, pockets and the like, and non-uniformity in the flowing stream when partially closed to throttle the flow. More particularly, the invention relates to a control valve handling streams of paper stock, white water, and the like liquid suspensions without developing an undesirable churning action in the stream and without creating pockets where lumps or clusters of suspended materials can collect.

Although the valves of this invention are especially adapted for the control of flowing streams of paper stock and white water which must be handled in a paper mill, and will be hereinafter specifically described in connection with such usage, it should be understood that the valves are capable of controlling the flow of any fluid through a conduit, and that the invention is now limited to any particular use of the valve.

In feeding stock through conduits to a paper machine, it is extremely important that the flow be positively controlled or throttled to any desired extent without deformation of pockets for the development of churning action in the stream. Moreover, it is important that the throttled stock flow uniformly to various branch lines in the conduit so as to obtain uniform distribution of the stock in all branches.

In accordance with this invention, a valve casing in the form of a hollow cylinder, carries flanges at each open end for sealingly connecting the casing to a pair of aligned spaced opposed conduits. One end of the casing is reduced in cross section to provide an annular valve seat for coacting with a substantially tear-shaped plug or valve member shiftably mounted within the casing. The shiftable plug carries diametrically opposed guide arms laterally extending from the sides which bearingly engage aligned plate portions formed in the casing walls. A control rod extends transversely through the plug and through the opposed arms, and through diametrically opposed and aligned longitudinally extending slots formed in the plate portions, the opposite ends of the rod terminating outside of the casing. A linkage assembly is connected to the opposite ends of the control rod outside of the valve casing and actuated by a nut and screw arrangement driven by a prime mover. Shifting of the plug through the linkage assembly toward and away from its seat varies the throttling effect of the valve on the fluid flow flowing through the conduits and valve casing.

Accordingly, it is an object of this invention to provide a valve for controlling flow of fluid through a conduit or pipe without impairing a smooth flow of the fluid.

A further object of this invention resides in the provision of a control valve having a longitudinally shiftably plug mounted in the center of a stream flowing through the valve for controlling the flow of a stream without disturbing smooth stream flow conditions by varying the capacity of a passageway through which the stream must flow.

A still further object of this invention is in the provision of a valve having a stationary casing and a longitudinal shiftable plug in the casing for controlling the fluid flow capacity of the valve in accordance with adjustable positioning of the plug.

Another object of this invention is to provide a stream flow valve for connecting aligned faced opposed conduits and controlling the fluid flow between the conduits.

Still another object of this invention is in the provision of a stream flow valve having a stationary casing and a longitudinally shiftable plug therein and mechanism mounted exteriorly of the casing for actuating movement of the plug.

Other objects, features, and advantages of the invention will be apparent from the following detailed disclosure, taken in conjunction with the accompanying sheets of drawings, wherein like reference numerals refer to like parts, in which:

Figure 1:
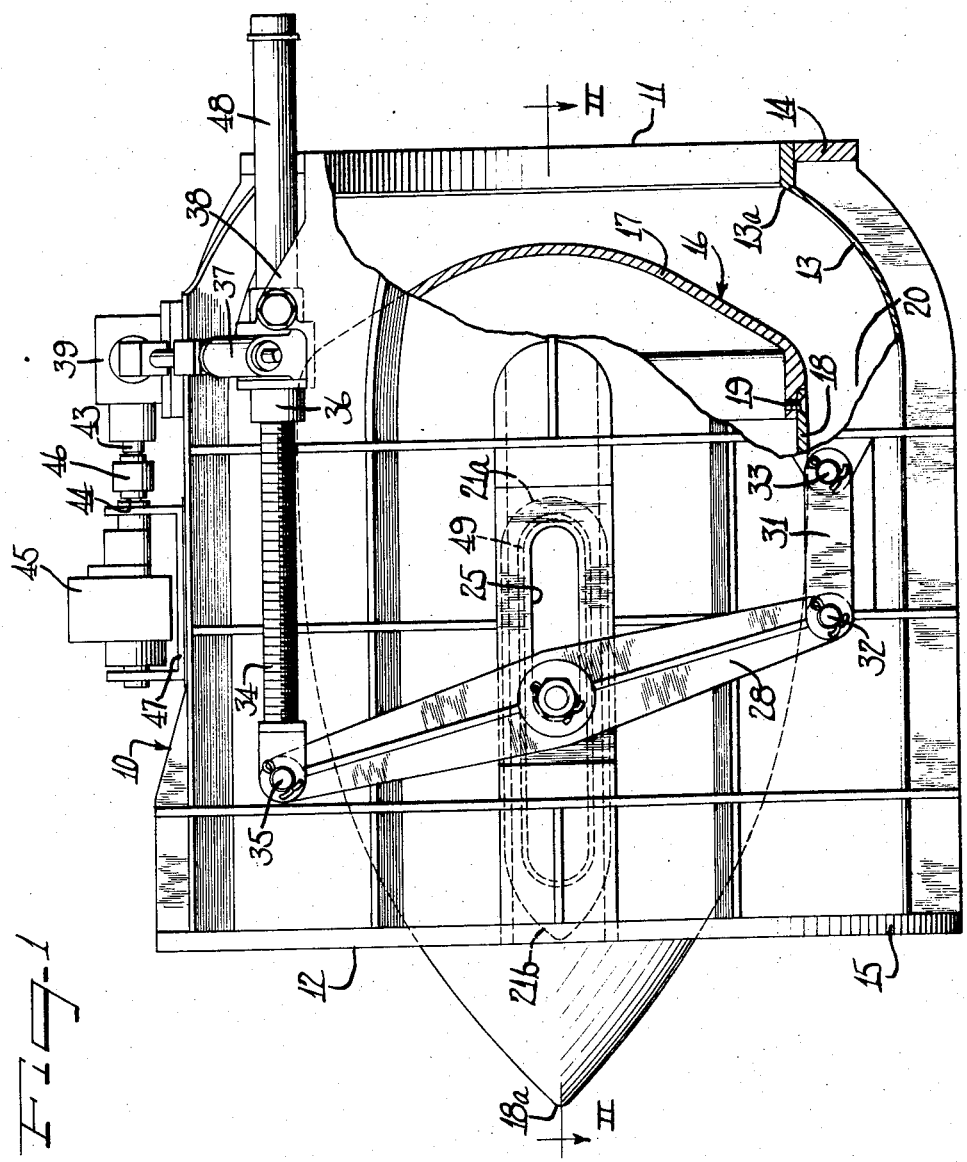
Figure 1 is an elevational view of a valve according to the invention, with some parts broken away to show underlying parts.
Figure 2:
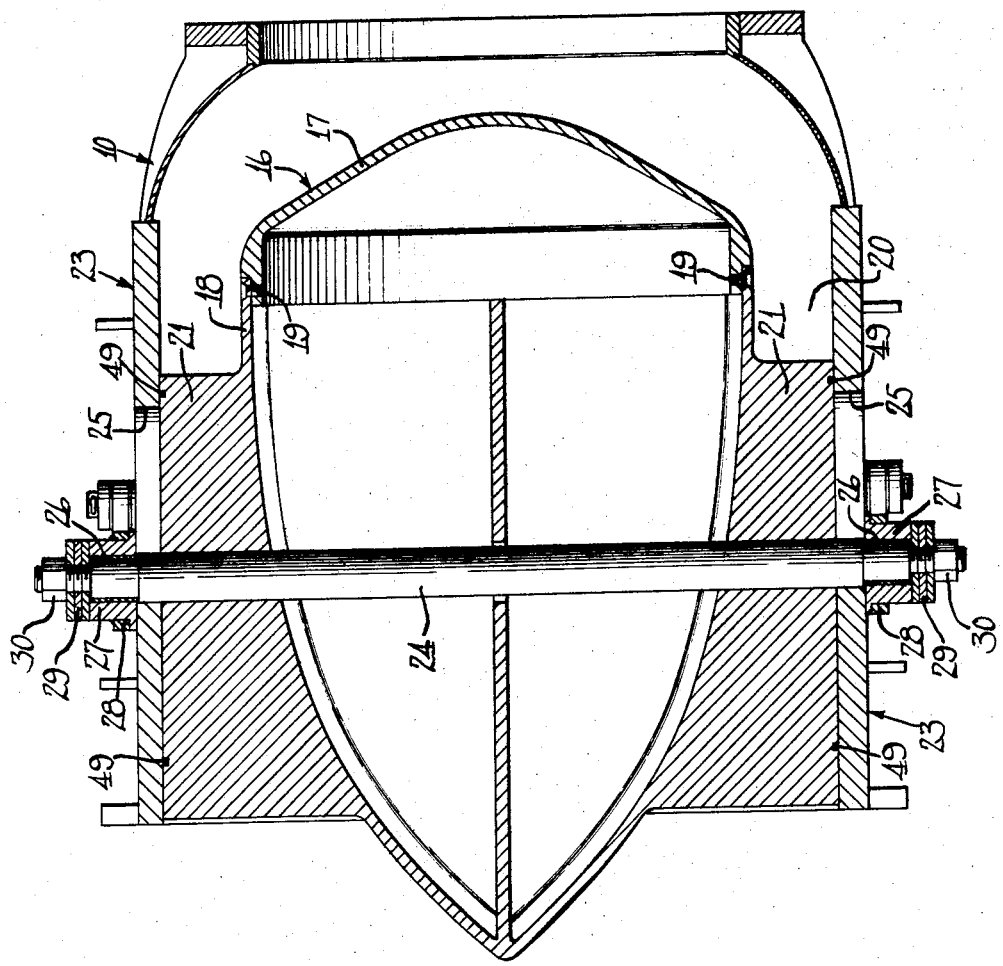
Figure 2 is a longitudinal sectional view, taken substantially along line II—II of Figure 1 and looking in the direction of the arrows.

In the drawings, the reference numeral 10 generally indicates a valve casing of substantially cylindrical shape having an inlet end 11 and an outlet end 12. At the inlet end a curvatious converging portion 13 is provided terminating radially inwardly from the outer diameter of the casing at 13a to define a valve seat. Radial flanges 14 and 15 are provided respectively at the inlet and outlet ends of the casing for connecting the casing between spaced and aligned conduit flanges. It will be appreciated that straight sections of conduits may be connected to each end, or if desired, an elbow pipe may be connected to either or both ends.

A substantially tear-shaped plug valve 16, mounted for longitudinal movement within the casing 10, includes a leading or head section 17 convexo-concave in shape with the convex side facing upstream towards the inlet end of the casing so as to divide a stream of stock flowing into the inlet 11 with as little agitation as possible. This head section 17 is sized diametrically larger than the valve seat 13a making it possible to completely stop the flow of stock to the inlet 11 when the valve seat 13a is engaged by this head section. The plug 16 also includes a main body section 18 extending rearwardly from the head section 17, converging along a tear-drop shaped path and terminating at the apex 18a. Actually, the head section 17 is removably secured to the hollow body section 18 of the plug by a plurality of fasteners 19. Thus, if the head section 17 becomes damaged it may easily be replaced, or if desired, a different shape head section may be substituted. The plug 16 is seen to define with the inner walls of the casing 10 an annular passageway 20 through which a stream of stock may flow.

It may be noted that for strengthening purposes, longitudinal and transverse ribs are formed on the outside of the casing 10, while longitudinally extending ribs are provided on the interior of the plug body section 18.

Extending laterally from diametrically opposite sides of the plug body portion 18 and integral therewith are a pair of guiding and supporting arms 21, 21. Each arm is elongate in shape and extends longitudinal of the plug body portion 18, and provided at the upstream end with a rounded portion and at the downstream end with a pointed portion to prevent the formation of eddy currents in the stock flow and to promote evenness in the stock flow. The arms 21 are provided with outer parallel faces and are longitudinally grooved at 22 (see Fig. 3) to slidably engage an inwardly extending tongue portion 23a of guide and mounting plates 23 suitably secured to opposite sides of the casing 10. The grooves 22 in the arms 21 and the tongue portions 23a of the plates 23 are in longitudinally aligned relationship.

To longitudinally shift the plug 16 in the casing 10, a control rod 24 is provided which extends transversely through the plug body 18 and the guiding and supporting arms 21. The opposite ends of the control rod 24 terminate outside of the casing 10 and are received in longitudinally aligned and extending slots 25 formed in the mounting and guide plates 23.

At each end of the control rod just outside of the plate 23, a diametrically reduced portion is provided which receives thereon a sleeve bearing 26. Pivotally carried on the sleeve bearings 26 are bosses 27, 27 of actuating levers 28, 28. The very outer ends of the control rod 24 outside of the lever mounting sections are further diametrically reduced and threaded to receive a plurality of washers 29 and nuts 30 for retaining the levers 28 on the control rod ends. One end of each lever 28 is pivotally connected to a link 31 at 32, the other end of the link 31 being pivotally carried on the casing 10 at 33. The other end of the lever 28 is pivotally connected to a screw threaded shaft 34 at 35.

A rotatable nut 36, in threaded engagement with the shaft 34 is carried by a worm gear unit 37 mounted on the outside of the casing 10 pivotally by a trunnion 38 secured to the casing 10. Actuation of the worm gear unit rotates the nut 36 to shift the position of the threaded shaft 34 relative to the trunnion mount 38 of the worm gear drive unit.

Figure 3:
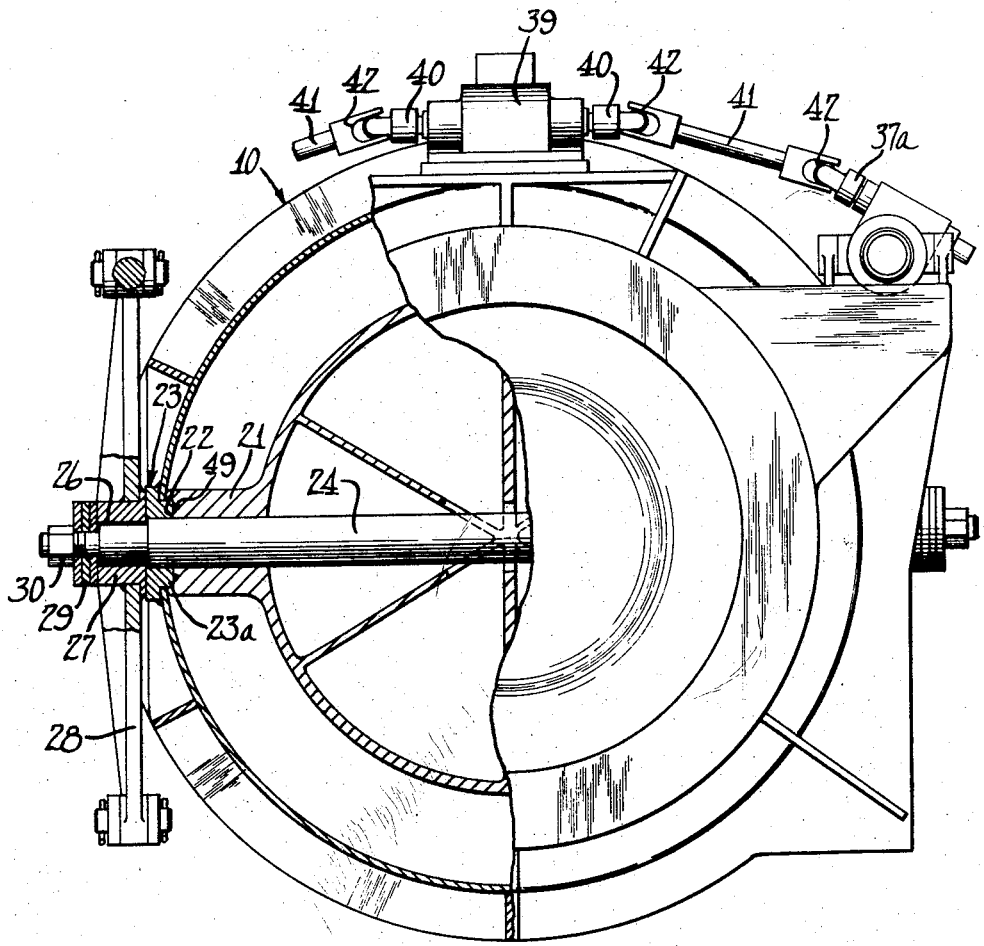
Figure 3 is an end elevational view of the inlet end of the valve according to the invention, with some parts broken away and other parts shown in section for purposes of clarity.

As seen most clearly in Figure 3, a right angle drive 39 is mounted on the top of casing 10 and provided with oppositely extending output shafts 40, 40 which are flexibly connected to each worm gear unit by a shaft 41 and universal joints or flexible couplings 42. One of the universal joints connect one end of the shaft 41 to an output shaft 40 of the right angle drive, while the other universal joint connects the other end of the shaft 41 to the input shaft 37a of a worm gear unit 37.

As seen most clearly on Figure 1, the right angle drive is provided with an input shaft 43 that is connected to the drive shaft 44 of a motor 45 through a flexible coupling 46. The drive motor 45 is mounted at its opposite ends in the upstanding legs of a U-shaped frame 47 rigidly secured to the top of the casing 10. In the instant case, the drive motor 45 is an air motor, but it should be understood that any suitable type of prime mover may be employed in the instant invention as long as it is a reversible motor.

In operation, actuation of the motor 45 drives a right angle drive 39 which, in turn, actuates the worm gear units 37 to rotate the nut 36 and shift the threaded shaft 34 relative thereto. Looking at Figure 1, it is seen that tubular members 48 are provided in mounted relationship to the worm gear units and axial alignment with the shaft 34 to receive in protective relationship therewith the free ends of the shafts. While not shown, flexible boots may be provided between the worm gear drive unit and the pivot point 35 on the shaft 34 to protect the threads on the shaft from undesirable foreign matter. Movement of the shaft 34 will cause the worm gear units to rock in the trunnion 38 while pulling the levers 28 toward the upstream end of the valve casing. Movement of the levers in the upstream direction shifts the plug 16 toward the valve seat 13a on the casing 10 for throttling the stream flow and restricting the capacity of the valve. Movement of the levers 28 will, of course, cause swinging of the links 31 about pivots 33. In order to prevent leakage of a stock from the casing 10 through the slots 25, the arms 21 sealingly engage the inner faces of the plates 23 by means of an endless flexible seal 49. While the seal is carried by the arms 21, it will be understood that it could be carried by the inner faces of the plates 23.

From the foregoing, it is seen that this invention provides a valve which includes a longitudinally shiftable plug mounted in a casing and actuating mechanisms for the plug mounted on the outside of the casing, wherein the valve is a completely independently operable unit capable of being mounted between spaced conduits for positively and accurately controlling the flow of fluid between the conduits and capable of producing a smooth and even flow of fluid between the conduits.

It will be understood that modifications and variations may be effected without departing from the scope of the novel concepts of the present invention, but it is understood that this application is to be limited only by the scope of the appended claims.

I claim as my invention:

1. A stream flow valve comprising a substantially cylindrical casing adapted to be mounted between spaced conduits, said casing having a reduced portion at the forward end thereof defining an inlet with a valve seat therein, a streamlined plug with streamlined arms intermediate its ends and formed therewith and mounted for longitudinal movement within said casing and coacting with the casing walls and said valve seat to throttle fluid flow therethrough, a plurality of longitudinal slots in said casing walls diametrically opposite each other, guide members mounted in said slots and carried adjacent the inner casing walls and having longitudinal guide slots therein, said arms carried by said plug in slidable engagement with said guide members, a control rod extending transversely through said plug and said arms and in slidable engagement with said guide member slots with its ends extending exteriorly of said casing, and means mounted solely on the exterior of said casing connected to the ends of said control rod for effecting movement of said plug with relation to said valve seat to vary the fluid flow capacity of said valve.

2. A stream flow valve comprising a substantially cylindrical casing adapted to be mounted between spaced conduits, said casing having a reduced forward end portion defining an inlet with a valve seat therein, a streamlined plug mounted for longitudinal movement with said casing and coacting with the casing walls and said valve seat to throttle fluid flow therethrough, a plurality of longitudinal slots arranged diametrically opposite each other in said casing walls, guide members carried adjacent the slots in the inner casing walls and having longitudinal guide slots therein, supporting and integral guiding arms carried by said plug in slidable engagement with said casing guide members, a control rod extending transversely through said plug and said arms and in slidable engagement with said guide member slots and with its ends extending exteriorly of said casing, and means mounted solely on the exterior of said casing connected to the end portions of said control rod outside said casing for effecting movement of said plug toward said valve seat to close the inlet opening and for effecting movement away from said valve seat to vary the fluid flow capacity of said valve.

3. A stream flow valve comprising a substantially cylindrical casing adapted to be mounted between spaced conduits, said casing having a reduced forward end portion defining a valve seat in the inlet opening therein, a streamlined plug mounted for longitudinal movement within said casing and coacting with the casing walls and said valve seat to throttle fluid flow therethrough, guide members carried on the inner casing walls and having longitudinal slots therein, supporting and guiding arms integrally carried by said plug in slidable engagement with said casing guide members, means providing sealing engagement between said arms and casing guide members to prevent leakage of fluid therebetween, a control rod extending transversely through said plug and said arms and in slidable engagement with said guide member slots and with its ends extending outside said casing, and means mounted solely on the exterior of said casing connected to the ends of said control rod outside said casing for effecting forward movement of said plug to contact said valve seat to close the inlet passageway, and for effecting rearward movement of said plug to vary the fluid flow capacity of said valve.

4. A valve comprising a casing having a fluid inlet with a valve seat therein, a longitudinally shiftable streamline plug mounted in said casing coacting with said inner casing walls and said valve seat to throttle fluid flow therethrough, guide slots in the casing walls, a rod extending transversely through said plug and said casing walls and having its end portions slidably received in said slots with its ends extending outside said casing, a lever pivotally connected at an intermediate point thereof to one end of said rod outside said casing, one end of said lever being pivotally connected through the intermediation of a link to the exterior of said casing and the other end of said lever being pivotally connected to a movable shaft, and means exterior of said casing for shifting said shaft and effecting movement of said plug with relation to said valve seat to vary fluid flow capacity of said valve.

5. A valve comprising a casing having a fluid inlet with a valve seat therein, a longitudinally streamline shiftable plug mounted in said casing coacting with said inner casing walls and said valve seat to throttle fluid flow therethrough, guide slots in the casing walls, a rod extending transversely through said plug and having its end portions slidably received in said slots and its ends extending outside said casing, a lever pivotally connected at an intermediate point thereof to one end of said rod, a second lever pivotally connected at an intermediate point thereof to the other end of said rod, one end of each lever being pivotally connected through the intermediation of a suitable link to said casing and the other end being pivotally connected to a movable shaft, and means exterior of said casing for shifting simultaneously each shaft and effecting movement of said plug with regard to said valve seat to vary fluid flow capacity of said valve.

6. A valve comprising a casing having a fluid inlet and a valve seat therein, a longitudinally streamline shiftable plug mounted in said casing having integral streamline arm members coacting with said inner casing walls and said valve seat to throttle fluid flow therethrough, guide slots in the casing walls, a rod extending transversely through said plug and said arm members and having its end portions slidably received in said slots with its ends extending outside said casing, a lever pivotally connected at an intermediate point thereof to one end of said rod, a second lever pivotally connected at an intermediate point thereof to the other end of said rod, one end of each lever being pivotally connected by suitable means to said casing and the other end being pivotally connected to a movable shaft, and actuating means mounted solely on the outside of said casing for shifting silmultaneously each shaft and effecting movement of said plug toward and away from said valve seat to vary fluid flow capacity of said valve.

7. A stream flow valve comprising a substantially cylindrical casing adapted to be mounted between spaced conduits, said casing having a reduced portion defining a fluid inlet with a valve seat therein, a streamlined plug with integral arm members mounted for longitudinal movement within said casing and coacting with the casing walls and said valve seat to throttle fluid flow therethrough, longitudinal slots provided in the casing side walls, guide members carried on the inner casing walls adjacent said casing slots and having longitudinal slots therein, said arm members providing supporting and guiding arms for said plug in slidable engagement with said casing guide members, a control rod extending transversely through said plug and said arms and with its end portions in slidable engagement with said guide member slots and its ends outside said casing, a lever outside of said casing having an intermediate portion thereof in pivotal engagement with one end of said rod, one end of said lever being pivotally mounted by suitable means to the casing and the other end of said lever being connected to a movable shaft, and means carried solely on the outside of said casing for shifting said shaft and effecting movement of said plug toward and away from said valve seat to vary the fluid flow capacity of said valve.

8. A stream flow valve comprising a substantially cylindrical casing adapted to be mounted between spaced conduits, said casing having a reduced portion defining a fluid inlet with a valve seat therein, a streamlined plug with streamline supporting and guiding arms mounted for longitudinal movement within said casing and coacting with the casing walls and said valve seat to throttle fluid flow therethrough, guide members carried on the inner casing walls extending through slots in said casing and having longitudinal slots therein, said supporting and guiding arms carried by said plug in slideable engagement with said casing guide members, a control rod extending transversely through said plug and said arms and its end portions in slidable engagement with said guide member slots with its ends extending outside said casing, a lever outside of said casing having an intermediate portion thereof in pivotal engagement with one end of said rod, a second lever outside of said casing having an intermediate portion thereof in pivotal engagement with the other end of said rod, one end of each lever being pivotally connected by suitable means to the outside of said casing and the other end of said lever being pivotally connected to a movable shaft, and actuating means carried on the outside of said casing for shifting said movable shafts and effecting movement of said plug toward and away from said valve to vary the fluid flow capacity of said valve.

9. A valve comprising a casing having a fluid inlet with a stationary valve seat therein, a longitudinally shiftable plug with supporting and guiding arm members mounted in said casing coacting with said inner casing walls and said valve seat to throttle fluid flow therethrough, guide slots in the casing walls, a rod extending transversely through said plug and said arms and having its end portions slidably received in said slots and with its ends extending outside said casing, a lever pivotally connected at an intermediate point thereof to one end of said rod, one end of said lever being pivotally connected by suitable means to said casing and the other end being pivotally connected to a shiftable threaded shaft, a worm gear unit carried on the outside of said casing having a rotatable nut in threaded engagement with said shaft, and means for actuating said worm gear unit to cause relative movement between the rotatable nut and the shaft and effecting movement of said plug relative to said stationary valve seat to vary fluid flow capacity of said valve.

10. A valve comprising a casing having a fluid inlet and a stationary valve seat therein, a longitudinally shiftable plug mounted in said casing coacting with said inner casing walls and said valve seat to throttle fluid flow therethrough, guide slots in the casing walls, a rod extending transversely through said plug and having its end portions slidably received in said slots with its ends extending outside said casing, a lever pivotally connected at an intermediate point thereof to one end of said rod, a second lever pivotally connected at an intermediate point thereof to the other end of said rod, one end of each lever being pivotally connected to said casing by suitable linkage and the other end being pivotally connected to a movable shaft, said shafts being threaded, a worm gear unit for each shaft having a rotatable nut in threaded engagement therewith, each unit being mounted on the outside of said casing, a right angle drive having two outputs for connection to said worm drive units, and a reversible motor carried on the outside of said casing in driving engagement with said right angle drive, wherein actuation of said motor effects movement of said plug with relation to said vavle seat to vary fluid flow capacity of said valve.

References Cited in the file of this patent

UNITED STATES PATENTS

| | | |
|---|---|---|
| 1,428,530 | Cassidy | Sept. 12, 1922 |
| 2,670,173 | Stehlin | Feb. 23, 1954 |
| 2,713,350 | Payne | July 19, 1955 |

FOREIGN PATENTS

| | | |
|---|---|---|
| 317,945 | Great Britain | Aug. 29, 1929 |
| 503,295 | Germany | July 23, 1930 |
| 547,191 | Great Britain | Aug. 18, 1942 |